C. J. WUNDERLICH.
AUTOMOBILE FENDER.
APPLICATION FILED FEB. 28, 1914.

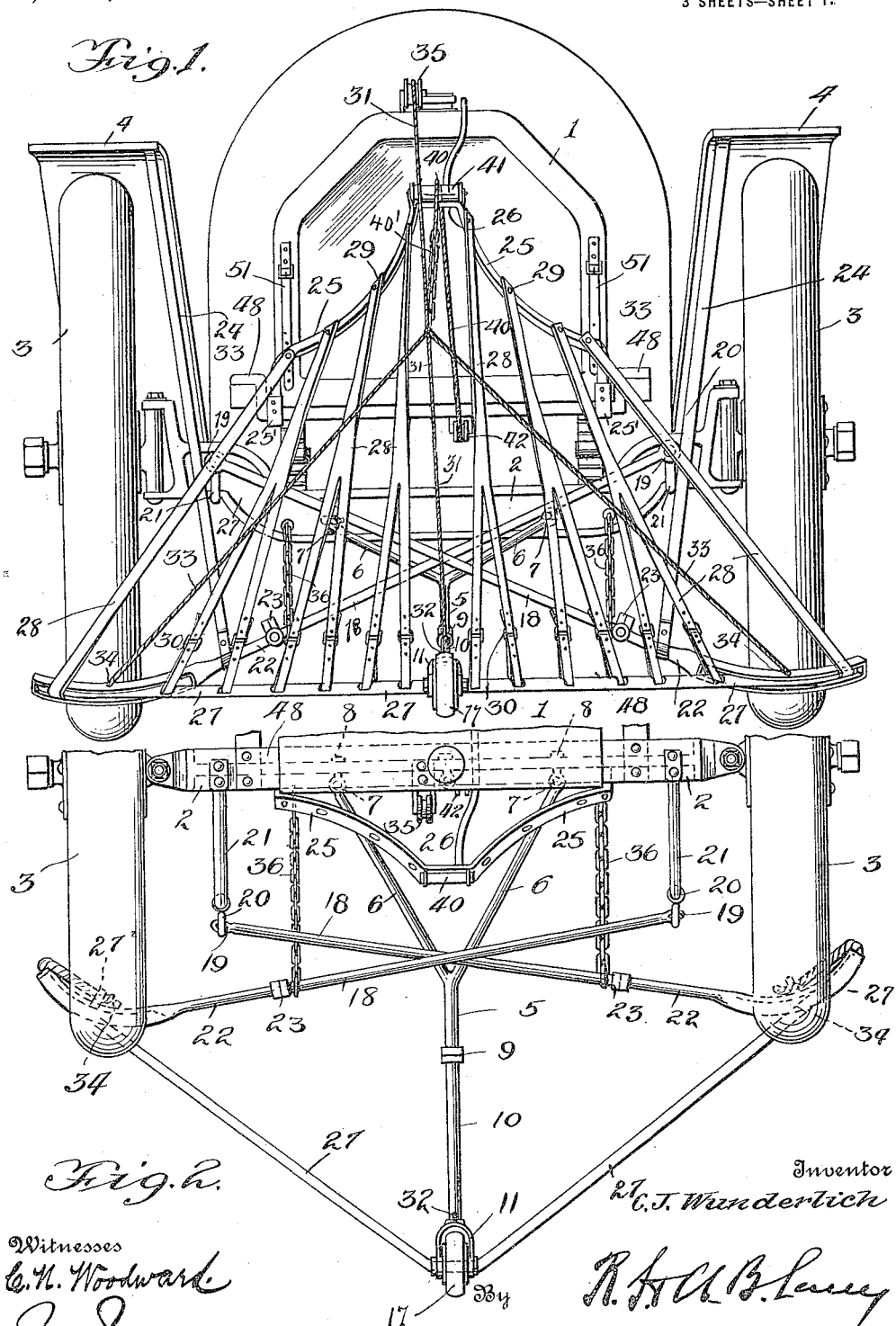

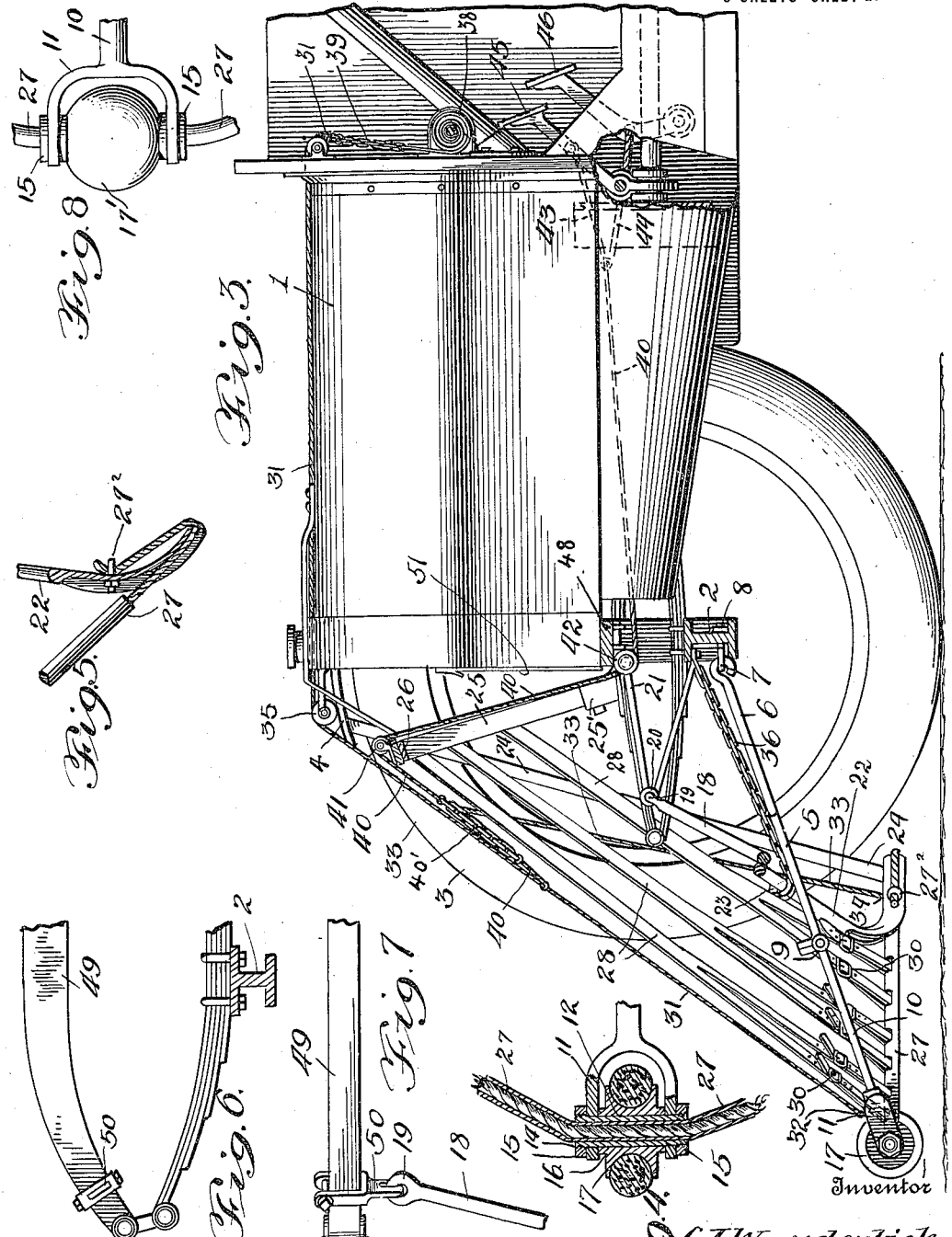

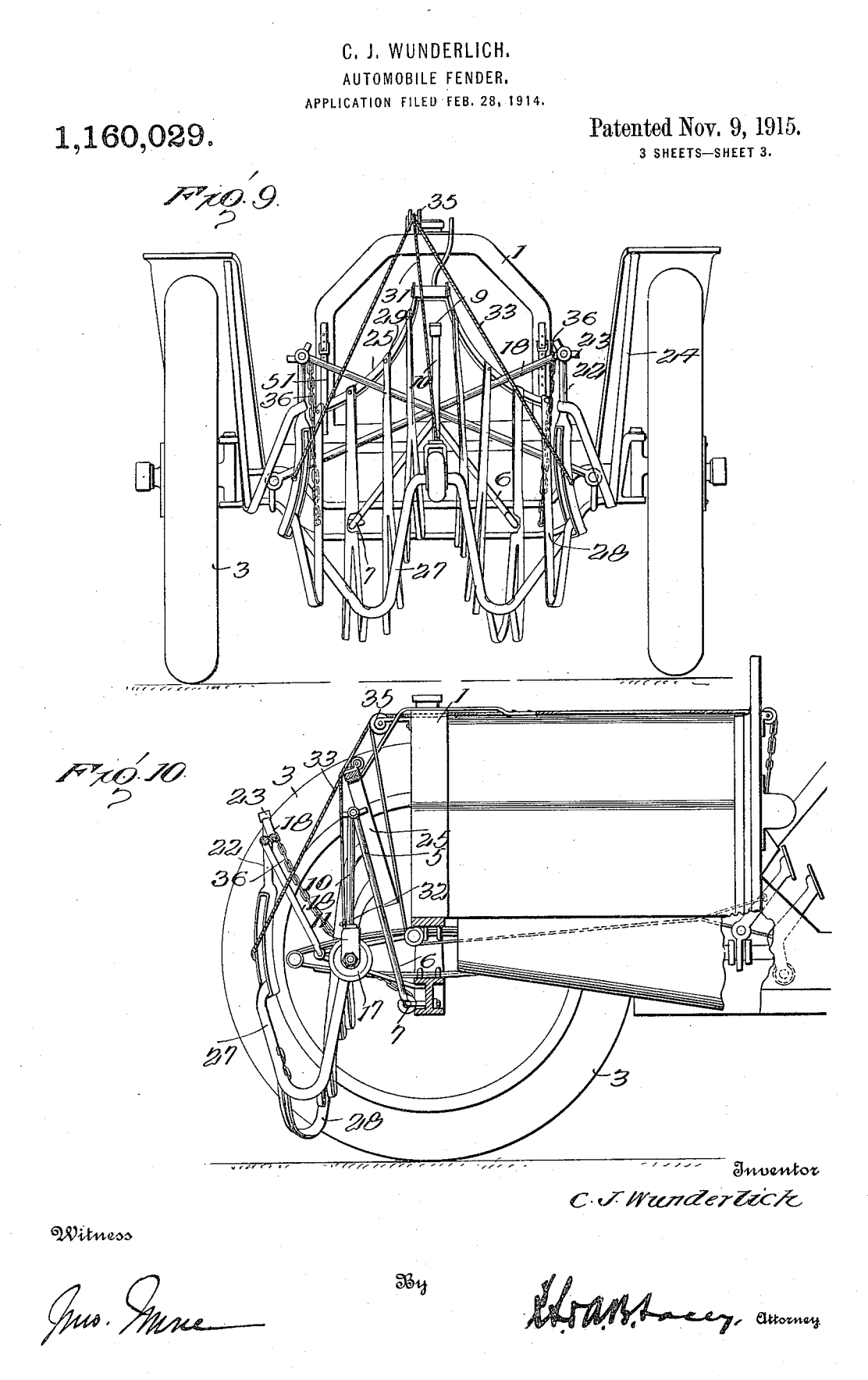

1,160,029.

Patented Nov. 9, 1915.
3 SHEETS—SHEET 3.

Fig. 9.

Fig. 10.

Witness
Jno. Imre

Inventor
C. J. Wunderlich

By
H. A. Stacey, Attorney

UNITED STATES PATENT OFFICE.

CHRIS J. WUNDERLICH, OF DEADWOOD, SOUTH DAKOTA.

AUTOMOBILE-FENDER.

1,160,029.

Specification of Letters Patent.

Patented Nov. 9, 1915.

Application filed February 28, 1914. Serial No. 821,776.

*To all whom it may concern:*

Be it known that I, CHRIS J. WUNDERLICH, citizen of the United States, residing at Deadwood, in the county of Lawrence and State of South Dakota, have invented certain new and useful Improvements in Automobile-Fenders, of which the following is a specification.

This invention relates to fenders for automobiles, and has for one of its objects to provide a fender which will not in any way interfere with the travel of the machine over rough roads, and when in operative position, will have its engaging forward end positioned relatively close to the road surface to positively preclude any possibility of the person or object struck falling beneath the wheels.

Another object of the invention is to provide a fender so constructed that while light in weight and incapable of inflicting any serious injury to a person struck thereby, will be sufficiently rigid when in operative position to support the person or object struck clear of the ground surface.

In the accompanying drawings: Figure 1 is a front elevation of the fender embodying the present invention. Fig. 2 is a top plan view of the fender, the straps constituting the supporting surface of the fender being removed for the sake of clearness. Fig. 3 is a vertical, front to rear, sectional view through the fender. Fig. 4 is a detail vertical transverse sectional view through the supporting wheel for the fender. Fig. 5 is a vertical sectional view illustrating the manner in which connection is provided between the fender and the clutch and emergency brake levers of the machine. Figs. 6 and 7 are detail views illustrating the manner of applying the device to automobiles having side frames extending in advance of the forward axle. Fig. 8 is a view illustrating a modification in the construction of the leader wheel. Fig. 9 is a front elevation of the fender in elevated or inactive position. Fig. 10 is a vertical longitudinal sectional view through the fender in raised position.

Corresponding and like parts are referred to in the following description and indicated in all the views of the drawings by the same reference characters.

In the drawings, the numeral 1 indicates in general the engine hood of the vehicle and 2 the front axle.

The wheels are indicated by the numeral 3 and their respective mud guards by the numeral 4.

The supporting frame for the fender includes an intermediate arm 5 which at its upper end is formed with branches 6 secured at their extremities in socket 7 carried by attaching clips 8 secured to the front axle at the middle thereof. The arm 5 extends downwardly and forwardly and has pivoted to it at its lower end, as indicated at 9, a second arm 10, the pivot joint being so constructed that the arm 10 will be supported rigidly when in alinement with the arm 5 or, in other words, when in the position shown in Fig. 3 of the drawings. The arm 10 is provided at its forward and lower end with a yoke 11 in the arms of which are fitted the ends of a sleeve 12, this sleeve being threaded, as at 14 at each end, and nuts 15 being threaded onto the ends of the sleeve to bear against the said arms of the yoke. The hub 16 of a wheel 17 is journaled upon the sleeve and this wheel is designed to travel normally above the road surface when the fender is in operative position.

In addition to the arm 5 and its associated arm 10, the frame includes a pair of crossed arms 18 each including two sections, these arms being crossed above the arm 5 as shown in Figs. 1 and 2 of the drawings, and the inner sections of the arms being provided at their inner ends with eyes 19 pivotally connected with eyes 20 upon brackets 21 which are secured to and depend from the axle 2 near its ends.

The outer section of each of the arms 18 is indicated by the numeral 22 and these sections are preferably curved so as to extend laterally and rearwardly, they being pivotally connected at their inner ends, as at 23, to the outer ends of the inner sections of the arms 18, and the pivotal connections being of the same character as that previously described and indicated by the numeral 9, whereby when the sections 22 are in the position shown in Fig. 1, they will be supported as against upward movement, and will in effect constitute laterally curved extensions of the arms 18. The outer sections 22 of the arms 18 are supported against downward movement by means of straps 24 which are connected at their lower ends to the said sections and at their upper ends to the mud guards 4. The crossed arms 18 are further supported by flexible members such as chains 36, each chain being connected at one end to the member 18 near the joint 23 and at their other ends to the axle 2.

By reference to Figs. 1 and 2 it will be observed that the sections 22 of the crossed arms extend in advance of the wheels 3 so as to guard against possibility of the person struck falling beneath the wheels. The frame of the fender further includes an arch member having side portions or legs 25 curved downwardly and laterally from the head or connecting portion 26 of the said members, the lower ends of the said legs being secured in sockets, which are in turn secured at 25' to the bolster 48 adjacent the ends thereof. By this means the arch frame is adjustably secured. The frame is completed by a flexible member 27 such as a rope incased in a rubber hose and which is secured at its ends to the ends of the curved outer portions of the sections 22 of the crossed frame bars and which passes through the sleeve 12 in the manner shown in Figs. 1, 2 and 4 of the drawings. The curved portions of the sections 22 are channeled to receive and support the ends of the member 27, and the latter are extended around the outer ends of the channeled portions and coupled to draw bolts $27^2$ of suitable construction, to enable the tension of the member 27 to be adjusted. The net or catching surface of the fender consists of a number of straps 28 which are secured at their upper ends as at 29 to the legs 25 of the arch member of the frame and which are connected at their lower ends, preferably by the employment of buckles 30, to the member 27 at suitable intervals and coact with the straps 24, as shown. These straps 28 may be of the form shown in Fig. 1, wherein they are illustrated as relatively wide at their upper portions and divided at their lower portions, or the net may be of some other form. It will also be apparent that if desired, the straps may be connected by cross straps, although as such a construction is wholly arbitrary it has not been illustrated.

It will now be apparent that when the fender is in operative position or, in other words, in the position shown in several figures of the drawings, the straps will be held taut by reason of the fact that the section 10 of the arm 5 and the sections 22 of the arms 18 are lowered and supported against downward movement. In this position, however, the forward or engaging side of the fender is located too close to the ground surface to permit of the machine being conveniently driven over rough roads and it is, therefore, expedient that some means be provided for holding the said sections of the arms 5 and 18 elevated and consequently out of position to engage obstacles in the road. This means consists of a cable or other suitable flexible connection 31 attached at one end as at 32 to the forward end of the arm 10 and provided with branches 33 which extend downwardly and are connected at their lower ends to the sections 22 of the arms 18 as indicated at 34. The cable 31 is led upwardly and over a pulley 35 mounted upon the top of the radiator portion and from this pulley is led rearwardly and preferably provided with a section of chain 39.

A spring 38 is coupled to the automobile at any convenient point, for instance to the dash portion, and formed with a terminal hook with which one of the links of the chain 39 which is connected to the cable 31 is adapted to be engaged, as shown in Fig. 3. By this means the member 31 is yieldably and adjustably supported, the object to be hereafter explained. The cable 31 is, of course, of such length that when the chain 39 is engaged with the hook of the spring 38, the pivoted sections 18 and 22 of the arms will be held in normal position as shown in Fig. 3, it being understood that when it is desired to lower or elevate the fender the chain 39 is to be disengaged from the spring and any desired link coupled to the hook of the spring 38.

In order that the movement of the fender or its depression by the body falling therein may serve to automatically actuate the clutch and brake levers, another cable 40 is connected at one end to the cable 31 and is led upwardly and over a pulley 41 which is mounted in the head 26 of the arch member of the frame. From the pulley 41 the cable 40 is led downwardly and around a pulley 42 upon the bolster 48 and thence rearwardly and provided with branches 43 and 44 connected respectively to the clutch lever 45 and emergency brake lever 46. A short section of chain 40' is connected into the cable 40 to prevent the disarrangement of the cable 40 when the cable 31 is actuated. When the fender is in normal position or ready for operation the cable 40 and its branches 43—44 will be slack, but it will be apparent that as soon as the arms 5—10 of the fender frame are forced downwardly the cable 40 will be drawn taut thereby pulling forwardly upon the levers 45—46 and automatically throwing out the clutch and applying the emergency brake.

When the improved device is applied to automobiles having the side members extending in advance of the forward axle, as at 49 in Figs. 6 and 7, the members 18 will be attached to the frame members, as shown at 50, thus dispensing with the supporting members 21. Straps or like fastening devices 51 are attached to the radiator or other part, to hold the fender in elevated position. If preferred, the leader wheel 17' may be in the form of a ball, preferably of rubber, as represented in Fig. 8.

Having thus described the invention, what is claimed as new is:

1. In a fender of the class described, a frame having frame arms including pivotally mounted inner sections and outer sections foldably connected therewith, means normally supporting the sections elevated and operable to release the same, a flexible member extending across between the ends of the foldable sections at the sides of the fender, the foldable section of one of the fender arms being located between the foldable sections of the other arms, a wheel carried thereby, and a catching surface supported in the frame.

2. In a fender of the class described, a frame having frame arms including pivotally mounted inner sections and outer sections foldably connected therewith, means normally supporting the sections elevated and operable to release the same, a flexible member extending across between the ends of the foldable sections at the sides of the fender, the foldable section of one of the fender arms being located between the foldable sections of the other arms, a wheel carried thereby, the wheel having a hollow hub and said flexible element extending through said hub.

3. In a fender of the class described, a frame including an arch frame member and arms comprising sections connected with the frame member sections foldably connected with the first mentioned sections, one of the foldable sections being located at each side of the frame and one being located between the first-mentioned sections, a ground wheel carried by the last-mentioned foldable section, a flexible frame member extending between and connecting the first-mentioned foldable sections, means normally supporting the foldable sections elevated and operable to release the same, and a catching surface supported between the arch frame member and the said flexible frame member.

4. In a fender of the class described, a frame having frame arms including relative rigid crossed sections and sections foldably connected therewith and supported thereby, a flexible frame element extending between the said foldable sections, an arm including a relatively rigid section, and a foldable section, the last-mentioned foldable section supporting a sleeve through which the said flexible frame element extends, an arch frame member, a supporting surface extending between the arch frame member and the flexible frame element, and a flexible element connected to the second-mentioned foldable arm section and having branches connected to the first-mentioned foldable sections, the said flexible element serving to support the foldable arm sections elevated and being operable to allow the same to lower.

5. The combination with a vehicle having a forward axle, of a fender including frame arms having rigid sections connected to the axle adjacent its opposite ends and extending in crossed relation in front of the axle, said arms including sections foldably connected with the first-mentioned sections, a flexible frame member extending between the foldable sections of the said arms, a frame member supported upon the axle, a supporting surface extending between the flexible frame member and the last-mentioned frame member, and means normally supporting the foldable arm sections elevated and operable to release the same.

6. The combination with a vehicle having a forward axle, of a fender including rigid frame arms connected to the axle adjacent to its opposite ends and extending in crossed relation in front of the axle, a flexible frame member extending between the rigid arm sections, a frame member supported upon the axle, a supporting surface extending between the flexible frame member and the last-mentioned frame member, and means normally supporting the rigid frame arms and operable to release the same.

7. In a fender of the class described, a frame including rigid arms, means normally supporting the rigid arms in elevated position and operable to release the same, a flexible member extending across between the ends of the rigid arms at the sides of the fender, one of the rigid arms being located between the first-mentioned arms, a wheel carried by the last-mentioned arm, and a catching surface supported by the frame.

8. In a fender of the class described, a frame including relatively rigid arms, means normally supporting the rigid arms in elevated position and operable to release the same, a flexible member extending across between the ends of the rigid arms at the sides of the fender, one of the rigid arms being located between the first-mentioned rigid arms, and a wheel carried by the last-mentioned arms, the wheels having a hollow hub and said flexible element extending through the hub.

9. In a fender of the class described, a frame including an arch frame and arms comprising relatively rigid sections, one of the rigid sections being located at each side of the frame and one of the sections being located between the first-mentioned arm sections, a ground wheel carried by the last-mentioned arm section, a flexible frame member extending between and connecting the first-mentioned arm sections, means normally supporting the rigid arm sections in elevated position and operable to release the same, and a catching surface supported between the arch frame member and said flexible frame member.

10. In a device of the class described, a frame having arms including relatively rigid crossed sections, a flexible frame element extending between the said rigid arm sections, another arm extending between said crossed arm sections, the last-mentioned section supporting a sleeve through which the said flexible frame element extends, an arch frame member, a supporting surface extending between the arch frame member and the flexible frame element, and a flexible element connected to the second-mentioned rigid arm section and having branches connected to the first-mentioned rigid arm section, the said flexible element serving to support the rigid arm sections in elevated position and being operable to allow the same to be lowered.

In testimony whereof I affix my signature in presence of two witnesses.

CHRIS J. WUNDERLICH. [L. S.]

Witnesses:
GEO. G. AINSWORTH,
W. T. HODGINS.

Copies of this patent may be obtained for five cents each, by addressing the "Commissioner of Patents. Washington, D. C."